(12) United States Patent
Parapatits (10) Patent No.: US 11,457,574 B2
(45) Date of Patent: Oct. 4, 2022

(54) DEVICE FOR MOISTENING AND/OR FERTILIZING PLANTS

(71) Applicant: Phytoniq Gmbh, Oberwart (AT)

(72) Inventor: Martin Parapatits, Oberwart (AT)

(73) Assignee: Phytoniq Gmbh, Oberwart (AT)

( * ) Notice: Subject to any disclaimer, the term of this patent is extended or adjusted under 35 U.S.C. 154(b) by 116 days.

(21) Appl. No.: 16/970,002

(22) PCT Filed: Feb. 14, 2019

(86) PCT No.: PCT/AT2019/060056
§ 371 (c)(1),
(2) Date: Aug. 14, 2020

(87) PCT Pub. No.: WO2019/157548
PCT Pub. Date: Aug. 22, 2019

(65) Prior Publication Data
US 2021/0368703 A1  Dec. 2, 2021

(30) Foreign Application Priority Data

Feb. 15, 2018 (AT) ............................... A 50140/2018
Apr. 11, 2018 (AT) ............................... A 50305/2018

(51) Int. Cl.
*A01G 25/09* (2006.01)
*A01C 23/04* (2006.01)
(Continued)

(52) U.S. Cl.
CPC ............ *A01G 25/09* (2013.01); *A01C 23/047* (2013.01); *A01G 31/06* (2013.01); *A01G 9/249* (2019.05)

(58) Field of Classification Search
CPC ........ A01G 25/09; A01G 2/249; A01G 31/06; A01C 23/047
See application file for complete search history.

(56) References Cited

U.S. PATENT DOCUMENTS 4,028,847 A * 6/1977 Davis .................. A01G 31/042
165/59
4,074,856 A 2/1978 Williams et al.
(Continued)

FOREIGN PATENT DOCUMENTS

CN 206251714 6/2017
CN 206274926 6/2017
(Continued)

OTHER PUBLICATIONS

International Search Report and the Written Opinion dated May 7, 2019 From the International Searching Authority Re. Application No. PCT/ AT2019/060056 and Its Translation of Search Report Into English. (11 Pages).

(Continued)

*Primary Examiner* — Monica L Barlow (57) ABSTRACT

The invention relates to a device for moistening and/or fertilizing plants (1), comprising a movable spray lance (3) with at least one spray nozzle (4) arranged on the spray lance (3), wherein a preferably linear guide rail (2) is provided, wherein the spray lance (3) is movably guided in the guide rail (2) in a trajectory extending parallel to the guide rail (2) and extends substantially normal to this trajectory, and wherein a drive, preferably a linear drive (11), is arranged for moving the spray lance in the area of the guide rail (2). The invention further relates to a system for cultivating plants without a substrate, comprising the device according to the invention.

30 Claims, 3 Drawing Sheets

(51) Int. Cl.
    *A01G 31/06*        (2006.01)
    *A01G 9/24*         (2006.01)

(56) References Cited

U.S. PATENT DOCUMENTS

| | | |
|---|---|---|
| 4,965,962 A | 10/1990 | Akagi |
| RE33,746 E | 11/1991 | Lucas |
| 2014/0311029 A1 | 10/2014 | Anderson et al. |
| 2015/0351329 A1 | 12/2015 | Heidi et al. |

FOREIGN PATENT DOCUMENTS

| | | |
|---|---|---|
| DE | 19740336 | 3/1999 |
| IL | 50126 | 1/1980 |
| KR | 10-2017-0005655 | 1/2017 |
| WO | WO 2013/136014 | 9/2013 |
| WO | WO 2017/062918 | 4/2017 |
| WO | WO 2019/157548 | 8/2019 |

OTHER PUBLICATIONS

Recherchenbericht [Search Report] dated Jul. 4, 2018 From the Oesterreichisches Patentamt [Austrian Patent Office] Re. Application No. A 50140/2018. (2 Pages).

* cited by examiner

DEVICE FOR MOISTENING AND/OR FERTILIZING PLANTS

RELATED APPLICATIONS

This application is a National Phase of PCT Patent Application No. PCT/AT2019/060056 having International filing date of Feb. 14, 2019, which claims the benefit of priority of Austrian Patent Applications Nos. A50140/2018 filed on Feb. 15, 2018, and A50305/2018 filed on Apr. 11, 2018. The contents of the above applications are all incorporated by reference as if fully set forth herein in their entirety.

FIELD AND BACKGROUND OF THE INVENTION

The invention relates to a device for moistening and/or fertilizing plants, comprising a movable spray lance with at least one spray nozzle arranged on the spray lance.

In the industrial cultivation of plants, the efficient and sustainable use of water, fertilizers or other substances is of central importance in order to ensure economic production. In addition, the even supply of a large number of plants with water and nutrients is important in order to achieve a homogeneous growth result.

A method which is known from the prior art and is already successfully employed for this purpose is known as aeroponics. In this method, the plants are fixed in a plane, wherein particularly the underground plant parts, for example roots or tubers, are not embedded in a solid substrate, such as soil. In order to provide water, nutrients and other auxiliary substances, the underground plant parts are regularly wetted with an aerosol of water or a nutrient solution.

In addition to the controlled application of water and nutrients, aeroponics is also suitable for cultivating plants in an extremely space-saving manner in greenhouses or the like, and an atmosphere suitable for the respective plant species can be created to ensure optimal growth conditions.

From US patent application US 2014/137471 A1 or from international patent application WO 98/56237 A1, stationary irrigation devices for aeroponic systems are known, wherein pipes are used to distribute the water or nutrient solution. However, these devices have a very elaborate design, since a separate atomizing device is required for substantially each position to be irrigated.

In US patent applications US 2017/202163 A1 and U.S. Pat. No. 4,965,962 A, generic mobile spray devices on a mobile carriage are described, which are designed to supply the underground parts of plants with water and nutrients. Such movable irrigation systems offer the advantage that the design effort required to create the irrigation infrastructure is reduced compared to stationary devices.

However, one disadvantage of irrigation devices for existing aeroponic systems with movable spray devices is that only a limited area can be irrigated at any one time due to the arrangement of the spray devices on a mobile carriage, and that the drive devices for the movable irrigation devices are located in the sprayed area, as a result of which they are regularly wetted with water, nutrient solution or the like (hereinafter generally referred to as "medium"), which may lead to increased corrosion and high material wear.

SUMMARY OF THE INVENTION

Thus, the object of the present invention is to overcome the disadvantages of the prior art and to provide an enhanced irrigation device for an aeroponic system.

The object of the invention is solved by the characterising features of the independent patent claims. According to the invention, it is provided that a preferably linear guide rail is provided, the spray lance being movably guided in the guide rail in a trajectory extending parallel to the guide rail and extending substantially normal to this trajectory, and that a drive, preferably a linear drive, is arranged for moving the spray lance in the area of the guide rail.

This allows an area to be wetted with the medium, which is as large as possible. This way, it can be guaranteed that the operation of such an aeroponic system is economical. Also, arranging the drive in the area of the guide rail guarantees that it is not located in the sprayed area. The drive may in particular be arranged directly on the guide rail or connected to the guide rail.

Optionally, it may be provided that actuators, sensors or cameras are arranged on the spray lance. The actuators may be used to sow seeds or harvest plants or fruits, for example. The sensors may be used to obtain plant diagnoses, for example.

By using actuators, sensors or cameras arranged on the spray lance, further processing or analysing steps may be performed in addition to wetting the plants with the medium.

By suitably selecting actuators, sensors and/or cameras, it may thus be possible to create a fully automatic aeroponic system which does not require the user to manually intervene from the time of sowing the seeds to the harvest of the plants. Optionally, cameras for visually monitoring the growth progress of the plants may be used. Optionally, it is also possible to use sensors for monitoring the temperature, for determining the relative humidity, for determining the gas composition in the atmosphere and for other analytical purposes.

Optionally, it may be provided that the spray lance is mounted on the guide rail via a preferably rod-shaped connector.

This way, the spray lance is arranged at a distance from the guide rail. Optionally, the medium may contain substances, which corrode mechanical components, in particular if they contain metal salts or the like. However, even if the medium contains pure water, permanent wetting of the movable parts, in particular the drive and the guide rail, may lead to corrosion. By using a connector, the spray lance may be arranged at a distance from the guide rail, which reduces the wetting of the movable parts with the medium. This may optionally increase the service life of the device according to the invention.

Optionally, it may be provided that the connector comprises a plurality of securing means, preferably latch openings, to allow the position of the spray lance to be adjusted.

This may allow the position of the spray lances to be adjusted easily, i.e. in particular to adjust the irrigation height or the irrigation position. This way, the position of the spray lances may be adjusted to the height of the plants or the length of the roots, for example.

Optionally, it may be provided that the spray lance comprises three to ten spray nozzles. Optionally, the spray nozzles may be designed to create an aerosol with a droplet size of 1 μm to 100 μm, wherein the medium supplied to the spray nozzles may optionally be applied with a pressure of 8 bar to 100 bar.

By using multiple spray nozzles, it can be guaranteed that the medium is dispersed across the entire extension of the spray lance as evenly as possible.

The atomizing efficiency of the spray nozzles may be regulated via the pressure of the supplied medium, among others. The dispersion of the aerosol may be regulated via the droplet size.

Optionally, it may be provided that the aerosol comprises a nutrient medium and/or water.

If the aerosol comprises a nutrient medium, the device according to the invention may be used not only for irrigating plants, but also for fertilizing plants. Preferably, the nutrient medium may contain all the nutrients necessary for the desired growth of the plants. Optionally, the aerosol may also contain pure water, in particular water without additional additives, such as tap water.

Optionally, it may be provided that at least two spray nozzles are designed to create overlapping spray cones.

In order to allow that the entire area to be irrigated is covered as efficiently as possible and in particular in order to leave no spots unirrigated, the spray cones of two spray nozzles may optionally overlap.

Optionally, it may be provided that gas outlet openings are provided on the spray lance or that a gas outlet lance is movably guided in the guide rail.

In order to provide a gas atmosphere preferred for the growth of the plants, the device according to the invention may optionally comprise means for supplying gases. To this end, gas outlet openings may additionally be provided on a spray lance equipped with spray nozzles. Optionally, also separate gas outlet lances may be provided, which are not provided with spray nozzles, but with gas outlet openings, the gas outlet lances being movable by an independent drive or by the drive also provided for the movement of the spray lance.

The gas applied through the gas outlet openings or via the gas outlet lances may contain carbon dioxide, for example. The gas supply may preferably take place via gas pipes.

Optionally, it may be provided that the drive is designed as a belt drive, wherein the belt drive comprises a stationarily arranged drive engine.

A stationarily arranged drive engine allows the structure of the drive to be simple. Optionally, it may be provided that the stationarily arranged drive engine is arranged in an area outside the area moistened by the spray lances. This protects the drive engine against humidity, which may increase the service life of the engine.

Optionally, it may be provided that the spray lance is movable via an endlessly revolving drive belt, the drive belt being guided by deflection rollers.

This allows the spray lances to be easily and efficiently moved. The drive belt may be designed as a drive cable, drive strip, drive chain or the like. Optionally, a first deflection roller may be provided, which is driven directly by the drive engine. This means that the first deflection roller may be directly connected to the drive shaft of the drive engine. Alternatively, a gear ratio may be provided between the drive engine and the first deflection roller.

The invention also relates to a system for cultivating plants without a substrate, comprising a device according to the invention and a preferably substantially horizontal plant support plane. This plant support plane is adapted to stabilise the plants in their rootstock region. In order to moisten underground plant parts, the spray lance is arranged at a distance below or above the plant support plane, the plant support plane extending substantially parallel to the movement plane defined by the movement of the spray lance.

Optionally, it may be provided that the spray lance is designed such that substantially the entire surface of the plant support plane may be moistened and/or fertilized.

In order to minimize the contact between the guide rail and the medium and the drive and the medium, the invention may optionally provide that the guide rail is arranged above or below the plant support plane. In that case, the spray lance may optionally be connected to the guide rail via a connector. Such an arrangement may prevent the medium from being constantly applied to the guide rail and the drive, which may lead to a prolonged service life and a reduced need for maintenance of the device according to the invention.

Optionally, it may be provided that a preferably linear gap is provided in the plant support plane, through which a connector for connecting the spray lance and the guide rail projects, the connector comprising a plurality of securing means, preferably latch openings, for adjusting the position of the spray lance.

This allows the guide rail and the drive device to be located above the plant support plane, which may lead to a further reduction of the negative effects of the possibly corrosive nutrient medium on the guide rail and the drive. Furthermore, a simple maintenance of the drive and the guide rail may be facilitated, since the area below the plant support plane does not have to be accessed. One configuration of the connector may optionally allow the position of the spray lance to be adjusted.

Optionally, it may be provided that at least two spray lances are provided. At least one spray lance may preferably be arranged above the plant support plane and at least one spray lance may preferably be arranged below the plant support plane.

This may allow the device according to the invention to be used simultaneously for the moistening of the underground and the above-ground plant parts.

Optionally, it may be provided that at least two spray lances are mounted on the guide rail via a common connector and are movable via a common drive. This allows a synchronized movement of multiple spray lances, while only using one drive.

However, it may optionally also be provided that the spray lances are mounted independently of one another on separate guide rails and are movable via independent drives. This allows the multiple spray lances to be moved independently.

Optionally, it may be provided that the device is arranged in a tray or comprises a tray, the tray bottom of which is inclined relative to the plant support plane and preferably has a tilt angle of 0.5° to 5°.

This optionally allows excess medium, which is collected in the lower portion of the system, to be drained effectively and prevents the formation of liquid buildups in the lower portion of the system according to the invention.

Optionally, it may be provided that the tray bottom comprises a drain for collecting and optionally reintroducing the medium applied. This allows the excess medium to be collected and reintroduced into the spray system.

Optionally, it may be provided that a lighting device is provided, the lighting device preferably being arranged in the area above the plant plane.

Optionally, it may be provided that the system comprises a frame structure and that at least one plant support plane is movably mounted relative to the frame structure.

Movably mounting a plant support plane or multiple plant support planes, respectively, allows single plant support planes to be accessed easily. Thus, harvesting plants or fruits and manually cultivating the plants as well as replanting the plant support plane can be performed easily.

Optionally, it may be provided that the plant support plane is movably mounted in a substantially horizontal plane, preferably in a plane parallel to the movement plane of the spray lance.

Optionally, it may be provided that movement means are arranged on the plant support plane, the movement means preferably comprising rollers or telescopic rods.

Movement means arranged on the plant support plane serve to reduce the friction between the frame structure and the plant support plane, so that less effort is required when the plant support plane is being extracted. If rollers are provided as movement means, they may preferably be arranged in guide rails. In addition to rollers and telescopic rods any other devices, which serve the purpose of reducing the friction when extracting the plant support plane, may be provided as movement means.

Optionally, it may be provided that cover profiles are provided within the frame structure for protecting the movement means, the cover profiles covering the movement means at least partially from above.

Applying water and fertilizers within the system according to the invention may lead to a deterioration in the performance of the movement means, e.g. due to corrosion. Cover profiles protect the movement means against excessive exposure to liquid. Covering the movement means from above protects the movement means, in particular against contacting sinking aerosol droplets.

Optionally, it may be provided that movement means are arranged on two outer edges of the plant support plane, which extend parallel to one another.

Optionally, it may be provided that six to twelve rollers each, preferably eight to ten rollers each, are arranged on two outer edges of the plant support plane, which extend parallel to one another.

Optionally, it may be provided that the plant support plane can be completely extracted from the frame structure.

If the plant support plane can be completely extracted or removed from the frame structure, it may be easily transported and manipulated. This also allows a transfer to other devices, such as systems according to the invention with different growth conditions, or a transfer to storage and transport devices. Advantageously, the manipulation of the plant support planes which can be extracted may be done automatically with the help of robots.

BRIEF DESCRIPTION OF THE SEVERAL VIEWS OF THE DRAWINGS

Further features of the invention become apparent from the patent claims, the figures and the exemplary embodiments.

In the following, the invention is discussed in detail with reference to two specific exemplary embodiments, wherein.

DESCRIPTION OF SPECIFIC EMBODIMENTS OF THE INVENTION

Figure 1A:
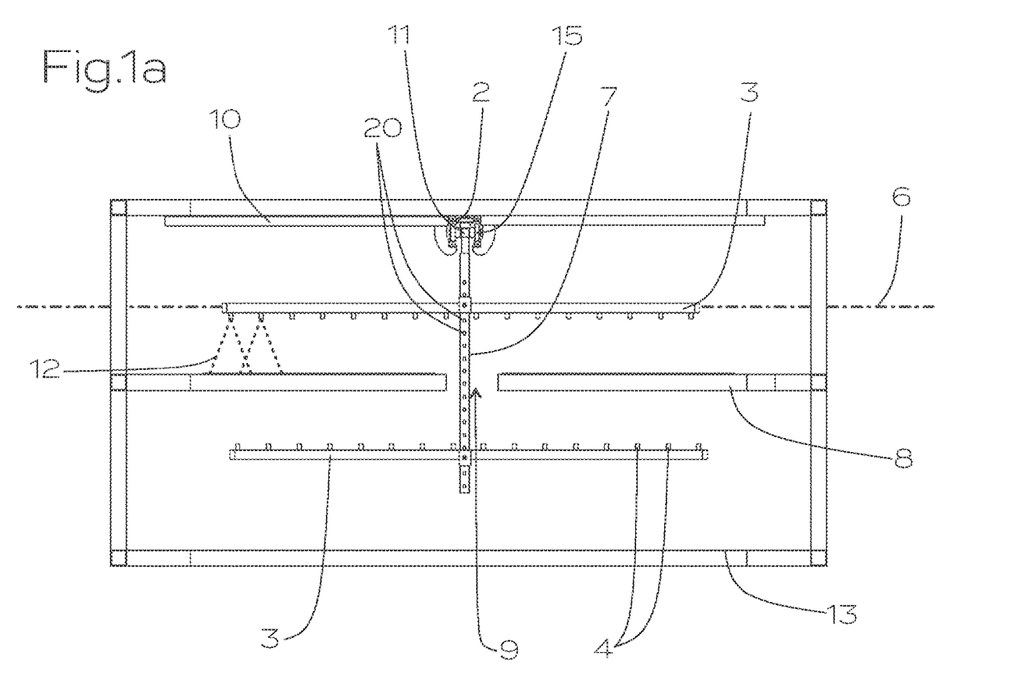
FIG. 1a shows a front view of a first embodiment of a system according to the invention with a central drive arrangement.
Figure 1B:
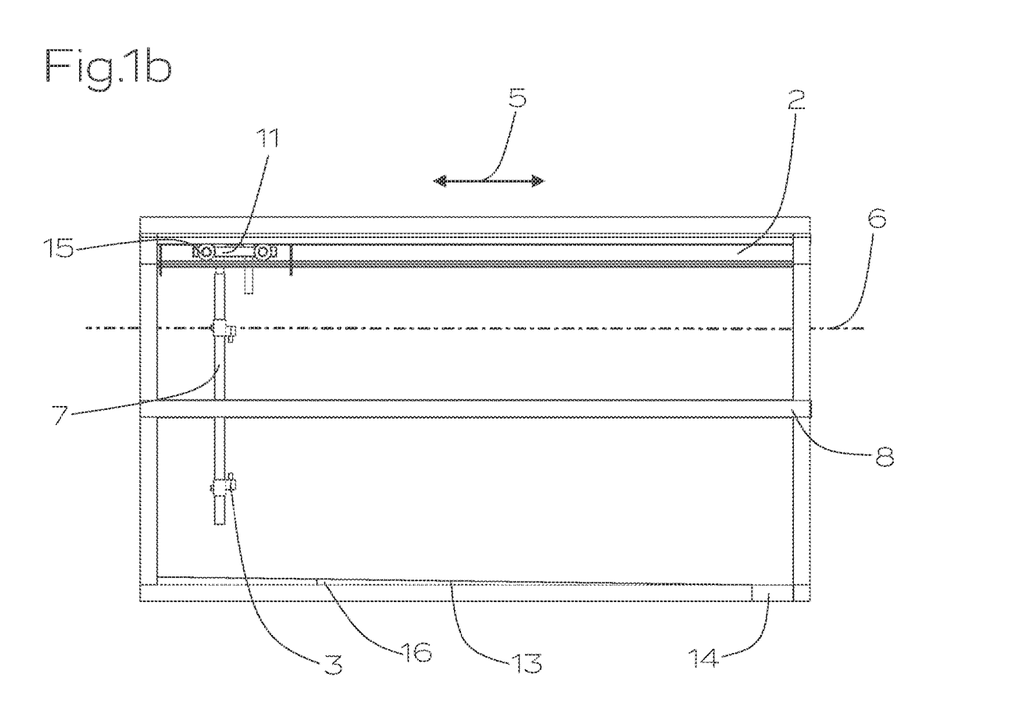
FIG. 1b shows a lateral view of the first embodiment of a system according to the invention with a central drive arrangement.

FIGS. 1a and 1b show a front view and a lateral view of a system according to the invention for the aeroponic cultivation of plants according to a first exemplary embodiment. For the sake of simplifying the illustration, no plants are shown in this exemplary embodiment.

The system according to the invention comprises two spray lances 3, which are movable along a direction of movement 5 normal to the figure in a movement plane 6 and/or parallel to the movement plane 6. In this exemplary embodiment, sixteen spray nozzles 4 are arranged on each of the two spray lances 3. The spray lances 3 are connected to the spray nozzles 4 via a connector 7 and, together, movably mounted in a guide rail 2. A linear drive 11 allows the spray lances 3 to be moved back and forth along the direction of movement 5. For minimising the frictional resistance, rollers 15 are provided, which engage the guide rail 2.

In the area above the plant support plane 8 a lighting device 10 is arranged. It serves the provision of the plants with light. The spectral composition of the light emitted by the lighting device 10 is preferably adapted to ensure that the plants grow as well as possible.

In this exemplary embodiment, the connector 7 has latch openings 20, on which the spray lance 3 may be fastened. Thus, the spray lance 3 may be adjusted in height depending on the height of the plants and other factors.

The spray nozzles 4 are arranged at such a distance to each other that the spray cones 12 generated by adjacent spray nozzles 4 overlap. This guarantees surface-wide wetting of the plant support plane 8 and the plants arranged thereon. In order to simplify the illustration, only two spray cones 12 are shown in FIG. 1a. Depending on the pressure of the medium supplied and the characteristics of the spray nozzles 4, the spray cones 12 may have different opening angles.

In this exemplary embodiment, a first spray lance 3 is arranged above the plant support plane 8, while the second spray lance 3 is arranged below the plant support plane 8.

In order to guarantee that the connector 7, which connects the two spray lances 3 and couples them to the guide rail 2, can move freely, a gap 9 is provided in the plant support plane 8. In this exemplary embodiment, the gap 9 extends in the direction of movement 5 across the entire extension of the plant support plane 8. Such an arrangement allows plant parts below the plant support plane 8 and plant parts above the plant support plane 8 to be supplied with the medium via two spray lances 3; however, only one drive 11 is necessary.

The medium is supplied to the spray nozzles 4 via lines not shown in this exemplary embodiment. In this exemplary embodiment, two separately extending lines are provided, which may supply the spray nozzles 4 of the spray lance 3 arranged in the area above the plant support plane 8 and the spray nozzles 4 of the spray lance 3 arranged in the area below the plant support plane 8 with different media. This may be especially advantageous if the above-ground plant parts, which are arranged above the plant support plane 8, are not to contact the nutrient solution, which is intended for the underground plant parts, which are located below the plant support plane 8. Optionally, however, only one supply line may be provided, so that the same medium is supplied to to both spray lances 3.

In this exemplary embodiment, the lower portion of the system according to the invention is designed as a substantially watertight tray 13. The bottom of the tray 13 is inclined by a tilt angle 16 to allow excess medium, which has not been taken up by the plants, to drain. In this exemplary embodiment, the tilt angle 16 is about 1°. However, in exemplary embodiments which are not shown, the value of the tilt angle 16 may be different.

Excess medium may be drained by means of a drain 14. A reintroduction of the medium into the system, in particular a configuration as a circulation system, is preferred, but not shown in this exemplary embodiment. When using the system according to the invention as intended, the plants are arranged in the area of the plant support plane 8, which stabilizes them. The plant support plane 8 substantially separates the underground plant parts, i.e. in particular the roots or tubers, from the above-ground plant parts, i.e. in particular the leaves, trunk, flowers etc. Medium atomized by the spray nozzles 4 provides the plants with nutrients. The spray lances 3 are moved back and forth by the linear drive 11 in the direction of movement 5, in order to provide all plants with medium equally. The spray lances 3 move in the movement plane 6 or, optionally, parallel to it.

Medium which is not taken up by the plants drips off of them and ends up in the tray 13, which is located in the lower area of the device according to the invention. The tilt angle 16 of the tray 13 allows the excess medium to be led to a drain 14.

When selecting the material for the system according to the invention, corrosion-resistant materials are preferred where appropriate. In particular, this applies to areas which often come into contact with water or salt-containing solutions. In this exemplary embodiment, the rollers 15 and the guide rail 2 are made of stainless steel. However, the invention is not limited to this material. In other exemplary embodiments, other materials may be provided.

Also the two spray bars 3 are made of stainless steel, the length of the spray bars being about 170 cm. The spray nozzles 4 are made of plastic. However, in other exemplary embodiments, the spray bars 3 and the spray nozzles 4 may be made of or comprise other metallic and non-metallic materials. Depending on the requirements, the spray bars 3 may have different lengths, e.g. 100 cm or 200 cm.

In this exemplary embodiment, the plant support plane 8 is made up of an arrangement of six plastic grids, which are not shown and have a size of about 87 cm×63 cm each. Three of these grids each are arranged on both sides of the gap 9. The grids are received in a holding device, which is not shown. In other exemplary embodiments, the plant support plane 8 may be formed as one piece. Optionally, the plant support plane 8 may be made of stainless steel or plastic or may comprise stainless steel and/or plastic.

In this exemplary embodiment, the linear drive 11 is a controlled servomotor with a reduction gear and a mean torque of about 12 Nm. In this exemplary embodiment, the transmission of force takes place via a rack and pinion. In other exemplary embodiments, which are not shown, the drive may be a toothed belt drive. In this exemplary embodiment, the maximum speed of movement of the spray bars 3 is about 1.5 m/sec.

In this exemplary embodiment, the frame 19 of the system is made up of frame profiles made of stainless steel, in particular of stainless steel type 1.4571. The cross section of the frame profiles used in this exemplary embodiment is 5 cm×5 cm.

In another exemplary embodiment, which is not shown, multiple plant support planes 8 are provided, which are arranged one above the other. This may further reduce the space requirements of a system according to the invention.

Figure 2A:
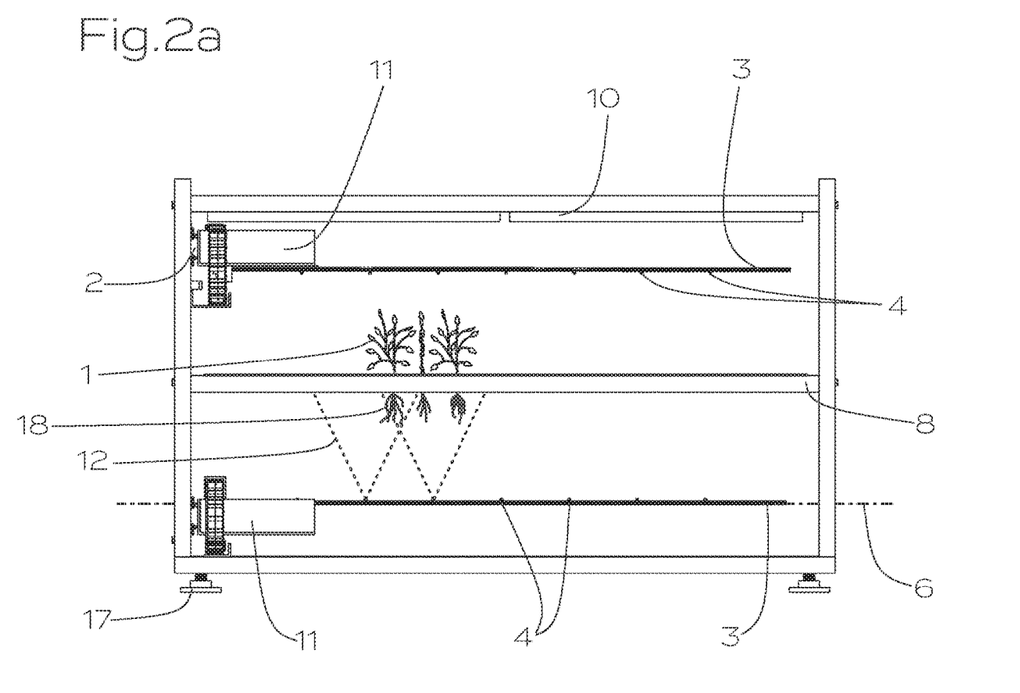
FIG. 2a shows a front view of a second embodiment of a system according to the invention with a lateral drive arrangement.
Figure 2B:
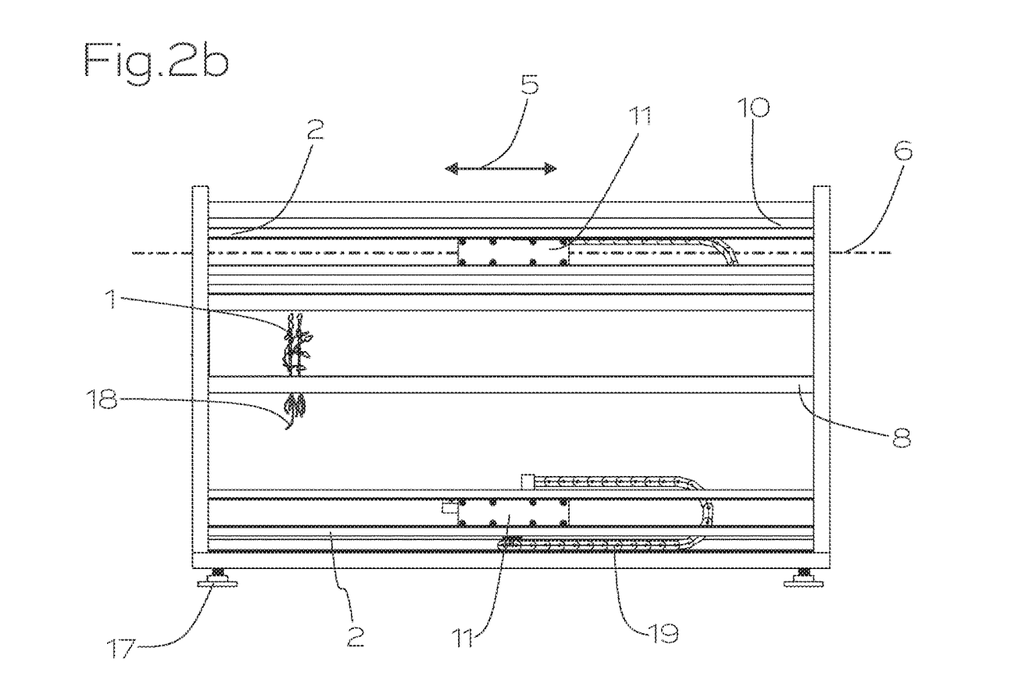
FIG. 2b shows a lateral view of the second embodiment of a system according to the invention with a lateral drive arrangement.

FIGS. 2a and 2b show a front view and a lateral view of a system according to the invention for the aeroponic cultivation of plants according to a second exemplary embodiment. The essential components correspond to the first exemplary embodiment. The materials used in this exemplary embodiment remain unchanged compared to the first exemplary embodiment described above.

However, a lateral linear drive 11 is provided in the second exemplary embodiment shown in FIGS. 2a and 2b to move the spray lances 3. Plants 1 with underground plant parts 18 are shown for illustration. However, to enhance the illustration, the plants 1 are only partially shown and not spread across the entire plant support plane 8.

The provision of two linear drives 11 allows the two spray lances 3 to be movable independently of one another, which allows the movement to be adjusted to the necessary irrigation conditions. The spray lance 3 which is arranged below the plant support plane 8 may be moved faster, for example, to prevent the underground plant parts 18 from desiccating. However, it might be advantageous to halt the movement of the spray lance 3 arranged above the plant support plane 8 in regular intervals to allow the medium to dry.

Also in the second exemplary embodiment according to the invention, a drain for draining excess medium is provided; however, it is not shown in the figures.

In this exemplary embodiment, the system is configured as a frame structure and arranged on pedestals 17 to allow it to be spaced apart from the ground.

In this exemplary embodiment, the transmission of force from the drive takes place via a rack and pinion. For stabilizing the supply line of the medium, guides 19 are provided. The guides 19 comprise flexible chain links, in which the supply lines of the medium, which are not shown, are arranged. This allows the supply lines, which are preferably made of flexible hoses, to be protected against bending, twisting or the like. In other exemplary embodiments, which are not shown, further conventional guiding devices may be used for the supply lines, in particular for hoses.

In another exemplary embodiment, which is not shown, gas outlet openings may be provided on the spray lances 3, which serve the creation of a desired gas atmosphere. The gas outlet openings may be arranged on the spray lances 3 in the area below the plant support plane 8 and on the spray lances 3 in the area above the plant support plane 8. According to a further exemplary embodiment, which is not shown, the release of a gas may take place via separate gas outlet lances, which do not comprise spray nozzles 4. These gas outlet lances may be connected to the linear drive 11 via a common connector 7, on which also the spray lances 3 are arranged. However, the gas outlet lances may also be driven by a separate linear drive 11.

Via the gas outlet openings or via the gas outlet lances, different gases, such as carbon dioxide, may be introduced into the area of the plants 1. The supply of the gases may take place via gas supply lines.

In a further exemplary embodiment, which is not shown, multiple plant support planes are provided, which are arranged one above the other, as described also for the first exemplary embodiment. This allows the necessary footprint for a system according to the invention to be reduced while keeping the number of cultivatable plants the same or, optionally, increasing it.

Figure 3:
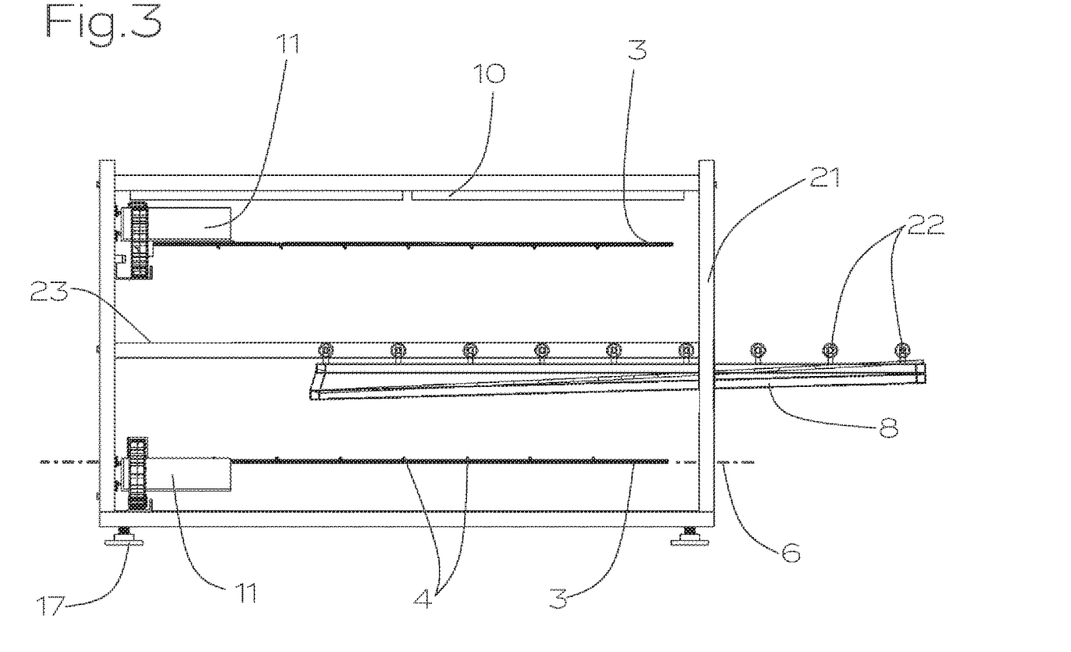
FIG. 3 shows a front view of a third embodiment of a system according to the invention with a lateral drive arrangement and an extractable plant support plane.

FIG. 3 shows a front view of a system according to the invention for the aeroponic cultivation of plants according to a third exemplary embodiment of the invention. For the sake of simplifying the illustration, no plants 1 and no spray cones 12 are shown in this exemplary embodiment.

Apart from the movable plant support plane 8 the third exemplary embodiment corresponds to the second exemplary embodiment shown in FIGS. 2a and 2b. Hence, also a lateral linear drive 11 for moving the spray lances 3 is provided.

In contrast to the second exemplary embodiment, an extractable plant support plane 8, which is inclined in order to allow excess liquid to drain, is provided in the third exemplary embodiment. In FIG. 3 it is shown in the partially extracted state. The plant support plane 8 has rollers 22, which serve as movement means, on two outer edges, which extend parallel to one another. In this exemplary embodiment, nine rollers 22 each are arranged on both outer edges. In further exemplary embodiments, which are not shown, a different number of rollers 22 may be provided. In other exemplary embodiments, telescopic rods may be used as movement means as well.

In the third exemplary embodiment described here of a system according to the invention, the rollers 22 are held in a guide rail arranged on the frame structure 21 of the system. In this exemplary embodiment, the guide rail is provided integral with a cover profile 23. In other exemplary embodiments, the guide rail may also be provided separately from the cover profile 23. The cover profile 23 serves to protect the movement means, in particular the rollers 22, against excessive exposure to moisture caused by the aeroponic system according to the invention, for example caused by sinking aerosol droplets.

In this exemplary embodiment, the plant support plane 8 may be designed in such a way that it can be extracted completely; hence, it may also be removed completely from the frame structure 21. This makes the cultivation of the plants on the plant support plane 8 easier and allows the plant support plane 8 to be transferred to a frame structure 21 of another system according to the invention. The manipulation of the plant support plane 8 is advantageously achieved automatically via a robot or a similar automated or automatable device. Preferably, a pick-up mechanism of the robot has a guide rail adapted to the geometry of the rollers 22. Alternatively, the manipulation of the plant support plane 8 may be achieved through human work.

Figure 4:
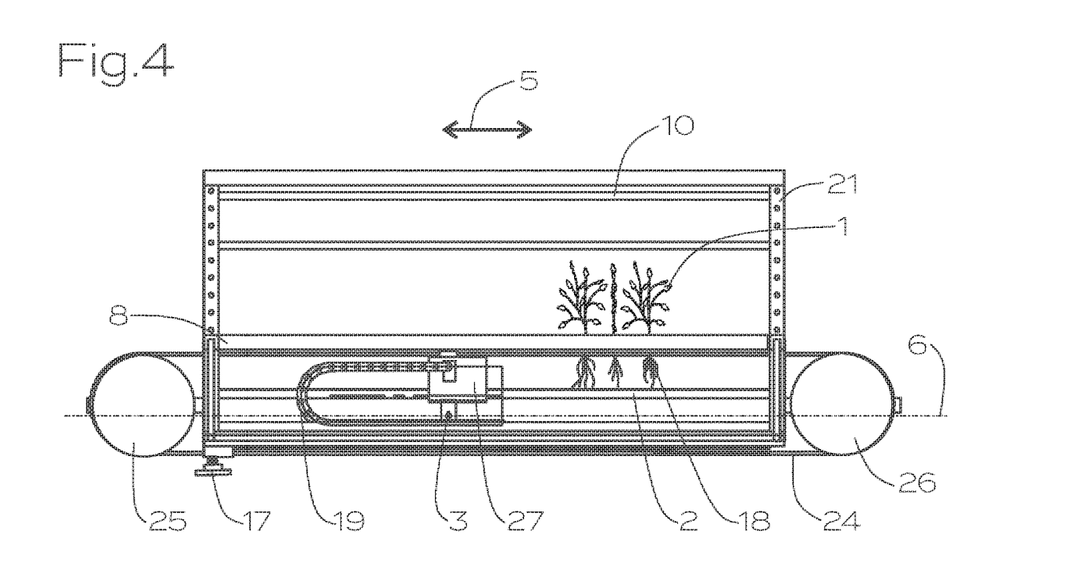
FIG. 4 shows a lateral view of a fourth embodiment of a system according to the invention with a lateral drive arrangement.

FIG. 4 shows a lateral view of a fourth embodiment of a system according to the invention with a lateral drive arrangement in the form of a belt drive. Similar to the second exemplary embodiment shown in FIGS. 2a and 2b, the system comprises a frame structure 21, in which a plant support plane 8 is arranged. The plant support plane 8 is adapted to receive plants 1. For the sake of simplicity, only one plant 1 is shown in the view shown. The underground plant parts 18 are arranged below the plant support plane 8. A spray lance 3 is also arranged below the plant support plane 3, the lance being movable in a movement plane 6 along a direction of movement 5. A lighting device 10 provides the plants 1 with UV radiation.

In this exemplary embodiment, the drive of the spray lance is designed as a belt drive, wherein a drive belt 24 is provided, which is guided over a first deflection roller 25 and a second deflection roller 26. The drive belt 24 is coupled to the spray lance 3 via a drive carriage 27, so that a movement of the first drive belt 24 is directly translated into a movement of the spray lance along the direction of movement 5. The drive carriage 27 is guided on a guide rail 2. A guide 19 serves to receive and guide supply lines, such as water pipes, which in particular lead water to the spray lance 3.

The first deflection roller 25 is driven by a drive engine via a gear transmission. In this view, the drive engine is hidden by the first deflection roller 25 and thus not visible. The drive engine is connected to a motor control, which allows the rotational speed of the drive engine to be controlled, for example. By moving the first deflection roller 25, the drive belt 24 is made to move, which also causes the spray lance to move. In this exemplary embodiment, the second deflection roller 26 is not driven by a drive engine, but only serves to deflect the drive belt 24. In this exemplary embodiment, the drive belt 24 is designed as a drive cable.

In this exemplary embodiment, the guide rail 2 is designed as a profile rail, the drive carriage 27 being coupled to the profile of the guide rail via a slotted guide.

REFERENCE LIST

1 Plant
2 Guide rail
3 Spray lance
4 Spray nozzle
5 Direction of movement
6 Movement plane
7 Connector
8 Plant support plane
9 Gap
10 Lighting device
11 Linear drive
12 Spray cone
13 Tray
14 Drain
15 Roller
16 Tilt angle
17 Pedestal
18 Underground plant part
19 Guide
20 Latch opening
21 Frame structure
22 Roller
23 Cover profile
24 Drive belt
25 First deflection roller
26 Second deflection roller
27 Drive carriage

What is claimed is:

1. A system for cultivating plants without a substrate, comprising a device for moistening and/or fertilizing plants (1), comprising a movable spray lance (3) with at least one spray nozzle (4) arranged on the spray lance (3), wherein a guide rail (2) is provided, wherein the spray lance (3) is movably guided in the guide rail (2) in a trajectory extending parallel to the guide rail (2), and wherein a drive, is arranged for moving the spray lance in the area of the guide rail (2), the system further comprising a horizontal plant support plane (8) adapted to stabilise the plants (1) in their rootstock region, wherein the spray lance (3) is arranged at a distance below or above the plant support plane (8) and wherein the plant support plane (8) extends parallel to the movement plane (6) defined by the movement of the spray lance (3), and wherein a gap (9) is provided in the plant support plane (8), through which a connector (7) for connecting the spray lance (3) and the guide rail (2) projects, the connector comprising a plurality of securing means for adjusting the position of the spray lance (3).

2. The system according to claim 1, wherein actuators, sensors, or cameras are arranged on the spray lance (3).

3. The device system according to claim 1, wherein the connector is a rod-shaped connector (7).

4. The system according to claim 3, wherein the connector (7) comprises a plurality of securing means to allow the position of the spray lance (3) to be adjusted.

5. The system according to claim 1, wherein the spray lance (3) comprises three to ten spray nozzles (4) which are implemented to generate an aerosol with a droplet size of 1 µm to 100 µm in a pressure range of 8 bar to 100 bar.

6. The system according to claim 5, wherein the aerosol contains a nutrient medium and/or water.

7. The system according to claim 5, wherein at least two spray nozzles (4) are designed to create overlapping spray cones (12).

8. The device system according to claim 1, wherein gas outlet openings are provided on the spray lance (3) or a gas outlet lance with gas outlet openings is movably guided in the guide rail (2).

9. The system according to claim 1, wherein the drive is designed as a belt drive, wherein the belt drive comprises a stationarily arranged drive engine.

10. The system according to claim 1, wherein the spray lance (3) is movable via an endlessly revolving drive belt (24), the drive belt (24) being guided by deflection rollers (25, 26).

11. The system according to claim 1, wherein the spray lance (3) is designed such that the entire surface of the plant support plane (8) may be moistened and/or fertilized.

12. The system according to claim 1, wherein the guide rail (2) is arranged above or below the plant support plane (8).

13. The system according to claim 1, wherein at least two spray lances (3) are provided, wherein at least one spray lance (3) is arranged above the plant support plane (8) and at least one spray lance (3) is arranged below the plant support plane (8).

14. The system according to claim 13, wherein the spray lances (3) are mounted on the guide rail (2) via a common connector (7) and are movable via a common drive.

15. The system according to claim 13, wherein the spray lances (3) are mounted independently of one another on separate guide rails (2) and are movable via independent drives.

16. The system according to claim 1, wherein the device is arranged in a tray (13) or comprises a tray (13), a tray bottom of which is inclined relative to the plant support plane (8).

17. The system according to claim 16, wherein the tray bottom comprises a drain (14) for collecting the medium applied.

18. The system according to claim 16, wherein the tray bottom has a tilt angle (16) of about 0.5° to about 5°.

19. The system according to claim 1, wherein a lighting device (10) is provided.

20. The system according to claim 19, wherein the lighting device (10) is arranged in the area above the plant support plane (8).

21. The system according to claim 1, wherein the system comprises a frame structure (21) and in that at least one plant support plane (8) is movably mounted relative to the frame structure (21).

22. The system according to claim 21, wherein the plant support plane (8) is movably mounted in a horizontal plane.

23. The system according to claim 21, wherein movement means are arranged on the plant support plane (8), the movement means preferably comprising rollers (22) or telescopic rods.

24. The system according to claim 23, wherein cover profiles (23) are provided within the frame structure (21) for protecting the movement means, the cover profiles (23) covering the movement means at least from above.

25. The system according to claim 24, wherein movement means are arranged on two outer edges of the plant support plane (8), which extend parallel to one another.

26. The system according to claim 25, wherein six to twelve rollers (22) each are arranged on two outer edges of the plant support plane (8), which extend parallel to one another.

27. The system according to claim 24, wherein the plant support plane (8) is movably mounted in a plane parallel to the movement plane (6) of the spray lance (3).

28. The system according to claim 21, wherein the plant support plane (8) can be completely extracted from the frame structure (21).

29. The system according to claim 1, wherein the guide rail (2) is linear.

30. The system according to claim 1, wherein the securing means are latch openings (20).

* * * * *